Figure 1:
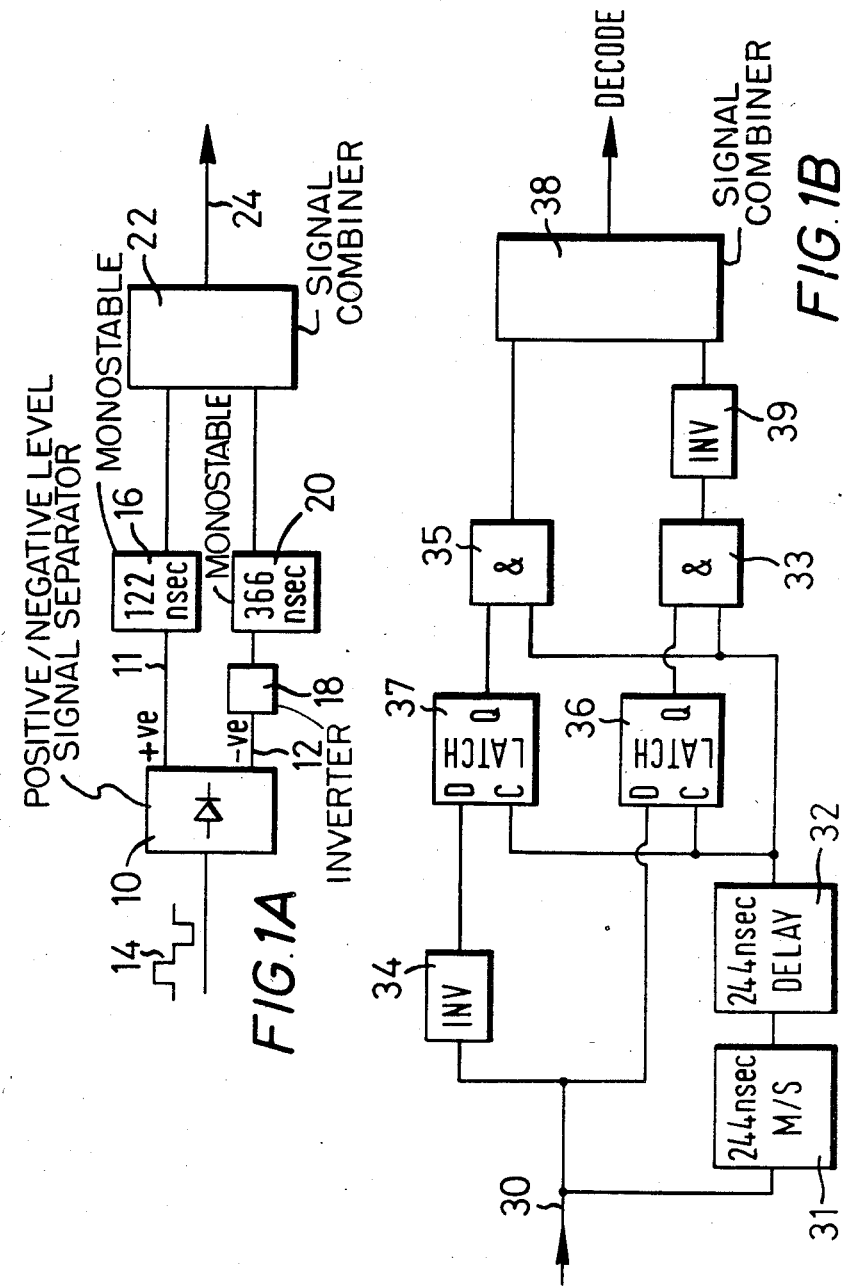

United States Patent [19]

Mountain

[11] Patent Number: 4,567,601
[45] Date of Patent: Jan. 28, 1986

[54] THREE-TO-TWO LEVEL DIGITAL SIGNAL CONVERSIONS AND VICE VERSA

[75] Inventor: Peter J. Mountain, The Hague, Netherlands

[73] Assignee: British Telecommunications, London, England

[21] Appl. No.: 514,956

[22] Filed: Jul. 18, 1983

[30] Foreign Application Priority Data

Jul. 19, 1982 [GB] United Kingdom ............... 8220836

[51] Int. Cl.⁴ .......................................... H03K 13/02
[52] U.S. Cl. .................................. 375/22; 340/825.63; 328/111
[58] Field of Search .................. 375/22, 17; 307/234; 329/106; 370/9; 340/825.63, 347 DD; 328/111; 455/608

[56] References Cited

U.S. PATENT DOCUMENTS

| | | | |
|---|---|---|---|
| 3,181,075 | 4/1965 | Klass | 328/167 |
| 3,855,419 | 12/1974 | Hurford | 370/9 |
| 4,014,002 | 3/1977 | Tucker | 375/110 |
| 4,178,549 | 12/1979 | Ledenbach et al. | 375/22 |
| 4,327,441 | 4/1982 | Bradshaw | 375/22 |
| 4,428,007 | 1/1984 | Tanaka et al. | 375/22 |
| 4,429,384 | 1/1984 | Kaplinsky | 375/22 |

FOREIGN PATENT DOCUMENTS 2083727 3/1982 United Kingdom .

OTHER PUBLICATIONS

Electronic Design, vol. 25, No. 8, Apr. 1977, p. 146, Rochelle Park, USA R. Stetson: "Consider Pulse-Width Modulation for Transmitting Data by Cable" p. 146, Left-Hand Column, Line 7–Right Hand Column, Last Line.

Primary Examiner—Marc E. Bookbinder
Assistant Examiner—Stephen Chin
Attorney, Agent, or Firm—Cushman, Darby & Cushman

[57] ABSTRACT

A three level signal is converted to a two level signal for transmission through a bi-level digital device by separating the opposite polarity parts of the three level signal. One part is inverted at an inverter and devices such as monostables are used to form two pulse trains in which the pulse lengths are different. The pulse trains are combined at a mixer and then transmitted through the device. Also disclosed is a decoder for decoding the pulses after transmission through the device.

6 Claims, 3 Drawing Figures

THREE-TO-TWO LEVEL DIGITAL SIGNAL CONVERSIONS AND VICE VERSA

This invention relates to digital transmission systems.

Some digital transmission systems, typically 2Mbit/sec systems, use a three level signal for transmission. A common example is a high density bipolar signal which has no more than three consecutive zeros. This signal format is known as HDB-3. Such transmission signals are used because there is effectively no average d.c. in the line. The three level signals however cannot be handled directly by for example, digital switching devices, since they employ binary logic. There is thus a need to convert the three level signal to a two level signal to enable it to be handled by the binary logic. Conventional binary converters do not preserve the errors or the clock content of the three level signal. At a digital telephone exchange this may not be of any consequence as it is the terminating point for the line transmission system and only needs to count rather than preserve errors. Furthermore, each input to the exchange must be aligned to the local clock prior to switching. However, at an intermediate point in the transmission path it may be essential to provide a fully transparent path for the three level signal which does not require the system to be synchronised and which allows end to end error monitoring. The present invention is concerned with a converter which can provide such a facility.

According to one aspect of the present invention there is provided a method of converting a three level signal for transmission through a bi-level digital device comprising separating the opposite polarity parts of the three level signal and inverting one part, converting one said part to pulses having a first pulse length and converting the other said part to pulses having a second pulse length which is different from said first pulse length, combining and transmitting said pulses through the digital device and decoding said pulses to regenerate the three level signal. The first pulse length may be one half the pulse length of the three level signal and the second pulse length may be 1.5 times the pulse length of the three level signal.

The decoding step may comprise forming a waveform comprising a series of pulses, one for each pulse transmitted through said device, each said pulse having a length corresponding to the pulse length of the three level signal forming an inverted version of the transmitted pulses, sampling and gating the transmitted pulses and the inverted pulses with said waveform to produce two pulse trains, inverting one said pulse train and mixing the pulse trains to produce the three level signal.

According to another aspect of the present invention there is provided a converter for converting a three level signal to a bi-level signal comprising means for separating the opposite polarity parts of the signal and inverting one part, means for converting one said first part to pulses having a first pulse length and for converting the other said part to pulses having a second pulse length which is different from said first pulse length and means for combining the converted pulses.

Figure 2:
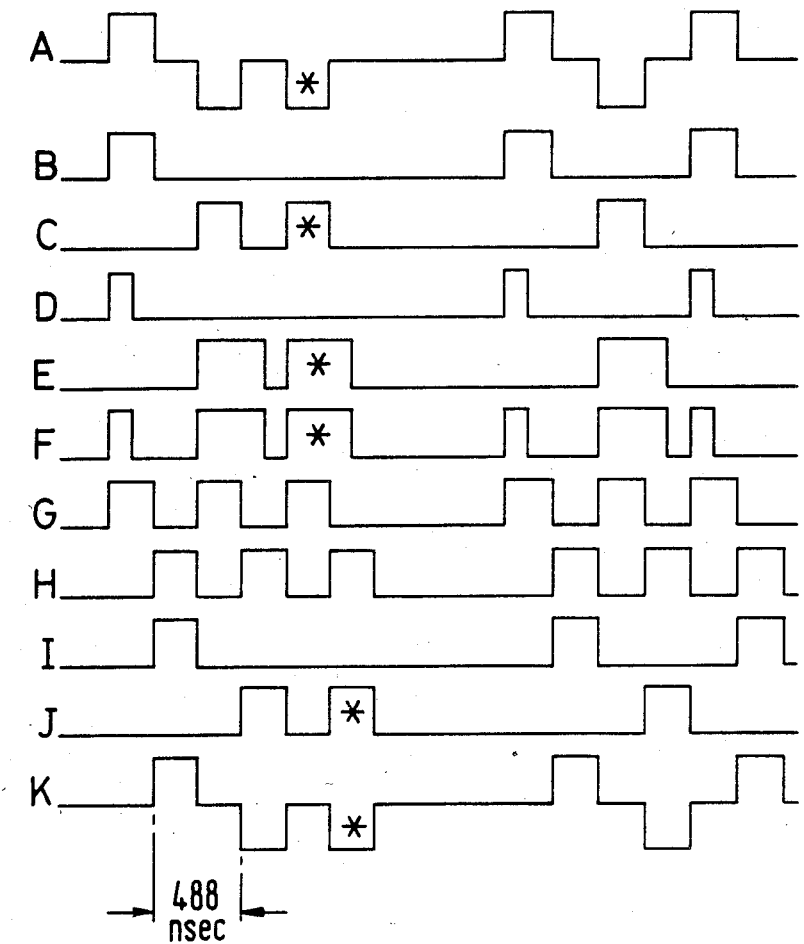

The invention will be described now by way of example only with particular reference to the accompanying drawings. In the drawings:

FIGS. 1A and 1B are block schematic diagrams of a converter in accordance with the present invention, and FIG. 2 is a series of waveforms illustrating the operation of the converter shown in FIG. 1.

Referring to FIG. 1A a converter for converting a three level 2Mbit/sec signal to a two level signal includes a circuit 10 which is arranged to produce two outputs on lines 11 and 12. One output on line 11 comprises the positive parts of the incoming waveform 14 and the other output on line 12 comprises the negative parts. The line 11 is connected to a first one-shot monostable 16 and the second output 12 is connected via an inverter 18 to a second one-shot monostable 20. The monostable 16 is arranged to produce, in response to each received pulse, a pulse having a pulse length of 122 nsec and the monostable 20 is arranged to produce, in response to each received pulse, a pulse having a pulse length of 366 nsec. The output of each monostable is connected to a combiner 22 the output of which on line 24 is a two level signal.

The operation of the apparatus just described can be understood from waveforms A to F shown in FIG. 2. The input to the circuit 10 is shown in waveform A. This is a three level HDB3 signal having a pulse length of 244ms. The output on line 11 is shown in waveform B and comprises the positive parts of the waveform A. The output on line 12 comprises the negative parts of the waveform A and these are inverted by inverter 18 to produce the waveform shown in waveform C. The waveform B is applied to the monostable 16 to produce the series of pulses shown in waveform D. It will be seen that these pulses have lengths which are one half the length of the pulses of waveform B. Similarly the pulses of waveform C are applied to the monostable 20 to produce the pulses shown in E. It can be seen that these pulses have lengths substantially 1.5 times the length of the pulses of waveform C. The outputs from the monostable 16 and 20 are combined at the combiner 22 to produce a single series of pulses on line 24. This is shown as waveform F. This signal can be transmitted through a digital device such as a digital switch as it is a two level signal.

When the signal has been transmitted through a device such as a digital switch it requires decoding to reform the original three level signal. This can be carried out by the decoder device illustrated in FIG. 1B. In this device the signal transmitted through the digital switch is fed along line 30. The pulses on line 30 are applied to a one shot monostable 31 which feeds a delay element 32. The pulses are also fed to the data input of a D-type latch 36 and via an inverter 34 to the data input of a D-type latch 37. The output of the latch 36 is connected to an AND gate 33 and the output of the latch 37 is connected to an AND gate 35. The output of the AND gate 35 is connected directly to a combining circuit 38 and the output of the AND gate 33 is connected to the combining circuit 38 via an inverter 39.

In operation the pulse train F which has been transmitted through the digital device is applied to the monostable 31 which produces a series of pulses corresponding in length (244 nsec) to the original pulse train 14. The monostable produces one pulse for each pulse of the pulse train F and each pulse produced has a start coinciding with the start of pulses F. The output of the monostable 31 is represented by waveform G in FIG. 2. Each pulse is then delayed in the delay element 32 by 244 nsecs to produce the pulse train shown in H. The output from the delay element 32 is fed to the clock input of each latch 36, 37. It can be seen from the waveforms shown in FIG. 2 that as the pulses of waveform H have a length equal to the original signal pulse length the state of the signal F at the leading edge of each pulse of waveform H will indicate a positive or a negative pulse in that pulse position in the original input. The latches 36, 37 are arranged to sample the input waveform F with the rising edges of the waveform H to provide an indication as to whether a short or long pulse was present. The output of each latch 36, 37 is gated with the waveform H at the AND gates 33 and 35 to produce the waveforms shown in I and J. The waveforms comprise pulses of the original duration i.e.—244 nsec. One of these outputs is inverted by inverter 39 and fed via the combining circuit 38 to produce the waveform shown as K. This waveform corresponds to the original three level signal A.

The pulses marked * in FIG. 2 are error pulses which would not be preserved by conventional three level to two level converters.

The delay 32 can be a monostable device which is arranged to be triggered from the falling edge of the waveform G.

The technique described above is applicable to a three level signal operating at any speed by suitable modification of the pulse widths and the delay. The embodiment described is for use at 2M bit/sec and could be easily modified for use at other Internationally agreed transmission rates of 8 and 34 Mbits/sec.

The circuits 16 and 20 can be implemented using a 74LS221 device, the circuit 22 using a 74ALS02 device, the circuits 31 and 32 a 74LS221 device, the circuit 34 a 74LS14 device, the circuits 36 and 37 a 74ALS74 device and the circuits 33 and 35 a 74ALS08 device. The circuits 12 and 18 and the circuits 38 and 39 can be implemented using transistor hybrid circuits in conjunction with a line transformer.

I claim:

1. A method of converting a three level signal for transmission through a bi-level digital device comprising separating the opposite polarity parts of the three level signal and inverting one part, converting one said part to pulses having a first pulse length and converting the other said part to pulses having a second pulse length which is different from said first pulse length, combining and transmitting said pulses through the digital device and decoding said pulses to regenerate the three level signal.

2. A method as claimed in claim 1 wherein the first pulse length is one half the pulse length of the three level signal and the second pulse length is 1.5. times the pulse length of the three level signal.

3. A method as claimed in claim 1 wherein the decoding step comprises forming a waveform comprising a series of pulses, one for each pulse transmitted through said device, each said pulse having a length corresponding to the pulse length of the three level signal, forming an inverted version of the transmitted pulses, sampling and gating the transmitted pulses and the inverted pulses with said waveform to produce two pulse trains, inverting one said pulse train and mixing the pulse trains to produce the three level signal.

4. A converter for converting a three level signal having pulses of first and second opposite polarity levels and of a third intermediate level to a bi-level pulse signal, said converter comprising:

means for separating the opposite polarity levels of the signal and inverting said first level, means for converting occurrence of said first level to pulses having a first pulse length and for converting occurrences of said second level to pulses having a second pulse length which is different from said first pulse length; and means for combining said first and second length pulses.

5. A converter as claimed in claim 4 wherein the first pulse length is one half the pulse length of the three level signal and the second pulse length is 1.5 times the pulse length of the three level signal.

6. A converter as claimed in claim 4 including means for decoding the said combined pulses, said decoding means comprising:

means for forming a waveform comprising a series of pulses, one for each pulse transmitted through said device, each said pulse having a pulse length corresponding to the pulse length of the three level signal, means for forming an inverted version of the combined pulses, means for sampling and gating the combined pulses and inverted pulses with said waveform to produce two pulse trains, means for inverting one of said two pulse trains, and means for combining said inverted pulse train with the remaining other one of said two pulse trains, to produce a decoded three level signal.

* * * * *